United States Patent
Ho et al.

(10) Patent No.: US 11,454,767 B2
(45) Date of Patent: Sep. 27, 2022

(54) MULTI-POLARITY FIBER OPTIC CONNECTOR HAVING A DUPLEX CABLE BOOT ASSEMBLY

(71) Applicant: Senko Advanced Components Inc, Marlborough, MA (US)

(72) Inventors: Man Ming Ho, Kowloon (HK); Man Kit Wong, Kowloon (HK)

(73) Assignee: Senko Advanced Components, Inc., Hudson, MA (US)

( * ) Notice: Subject to any disclaimer, the term of this patent is extended or adjusted under 35 U.S.C. 154(b) by 0 days.

(21) Appl. No.: 16/596,635

(22) Filed: Oct. 8, 2019

(65) Prior Publication Data

US 2020/0116955 A1 Apr. 16, 2020

Related U.S. Application Data

(60) Provisional application No. 62/744,628, filed on Oct. 11, 2018, provisional application No. 62/744,603, (Continued)

(51) Int. Cl.
*G02B 6/38* (2006.01)

(52) U.S. Cl.
CPC ........... *G02B 6/3879* (2013.01); *G02B 6/387* (2013.01); *G02B 6/3825* (2013.01); *G02B 6/3877* (2013.01)

(58) Field of Classification Search
CPC ...... G02B 6/38; G02B 6/3833; G02B 6/3869; G02B 6/00
(Continued)

(56) References Cited

U.S. PATENT DOCUMENTS 5,638,474 A * 6/1997 Lampert .............. G02B 6/3879
385/78
5,647,043 A * 7/1997 Anderson ............ G02B 6/3825
385/78
(Continued)

FOREIGN PATENT DOCUMENTS

CN 106383383 A 2/2017
DE 10196158 B3 1/2014
(Continued)

OTHER PUBLICATIONS

International Search Report and Written Opinion, Application No. PCT/US19/55258, dated Feb. 5, 2020, p. 12.

*Primary Examiner* — Kaveh C Kianni

(57) ABSTRACT

A multi-polarity fiber optic connector is configured to provide a plurality of connector polarity options. Two LC connectors are grouped together using a duplex cable boot assembly which is secured over a backpost extending from a plug frame of each LC connector. Each LC connector has a release latch attached to the outer surface of the plug frame. A dual release latch has a hook that secures the dual release latch to the duplex cable boot. The dual latch release is configured to depress each LC connector latch release together. To change the duplex LC connector from a first polarity to a second polarity, a user pulls on one of the two cable boots that makes up the duplex cable boot assembly and then rotates each LC connector housing, or the user pulls on the dual latch release and then rotates each LC connector housing. User rotates each LC connector housing 180 degrees about a longitudinal axis of the LC connector to change the connector polarity from a first polarity to a second polarity where the first polarity is opposite the second polarity.

11 Claims, 17 Drawing Sheets

Related U.S. Application Data filed on Oct. 11, 2018, provisional application No. 62/743,945, filed on Oct. 10, 2018.

(58) Field of Classification Search
USPC .......................................................... 385/78
See application file for complete search history.

(56) References Cited

U.S. PATENT DOCUMENTS

| | | | |
|---|---|---|---|
| 8,636,544 B1* | 1/2014 | Briant | H01R 13/514 439/607.25 |
| 9,946,035 B2 | 4/2018 | Gustafson et al. | |
| 2002/0090177 A1* | 7/2002 | Anderson | G02B 6/3825 385/60 |
| 2006/0206246 A1* | 9/2006 | Walker | G06Q 10/00 701/16 |
| 2008/0112673 A1* | 5/2008 | Kanou | G02B 6/3897 385/78 |
| 2008/0131055 A1* | 6/2008 | Parkman | G02B 6/3825 385/58 |
| 2010/0081303 A1* | 4/2010 | Roth | G02B 6/3817 439/140 |
| 2010/0220961 A1* | 9/2010 | de Jong | G02B 6/3879 385/77 |
| 2013/0163934 A1* | 6/2013 | Lee | G02B 6/3879 385/78 |
| 2014/0133808 A1* | 5/2014 | Hill | G02B 6/3857 385/81 |
| 2014/0205257 A1* | 7/2014 | Durrant | G02B 6/241 385/139 |
| 2015/0160417 A1 | 6/2015 | Park et al. | |
| 2017/0293088 A1* | 10/2017 | Manes | G02B 6/3878 |
| 2017/0293089 A1* | 10/2017 | Gustafson | G02B 6/3871 |
| 2019/0170961 A1* | 6/2019 | Coenegracht | G02B 6/4444 |

FOREIGN PATENT DOCUMENTS

| | | |
|---|---|---|
| ES | 2425229 T3 | 10/2013 |
| TW | 310380 B | 7/1997 |

* cited by examiner

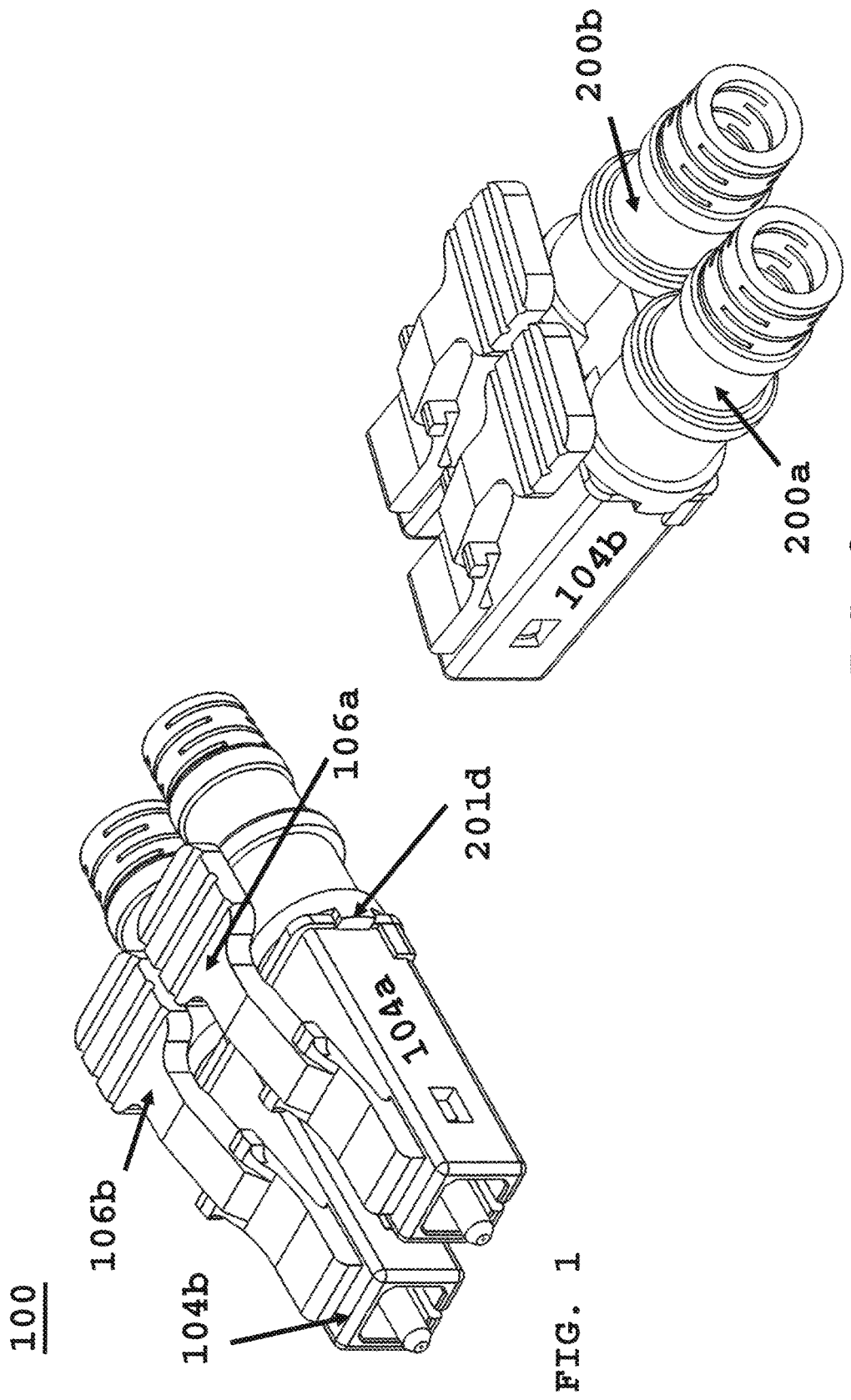

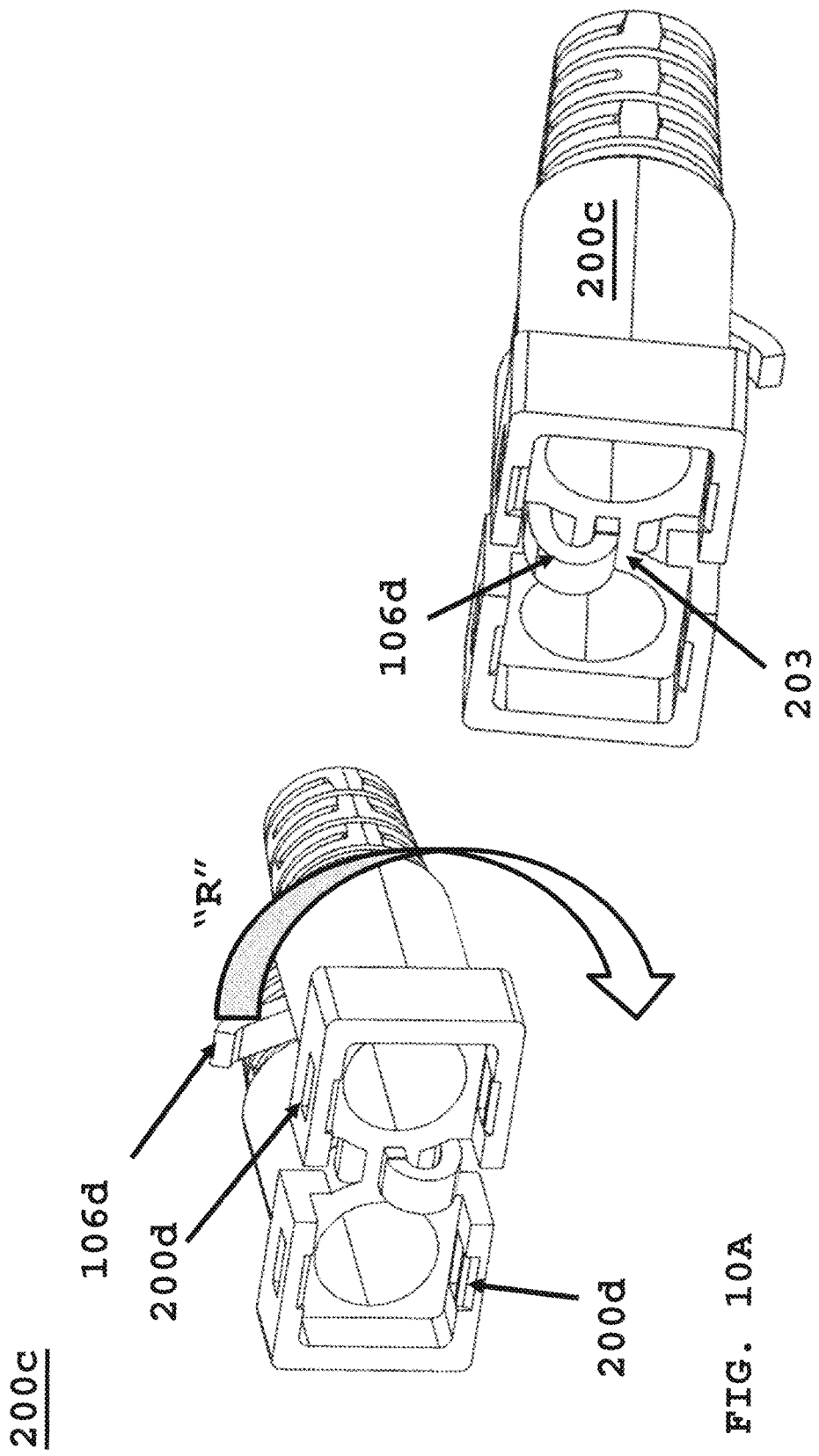

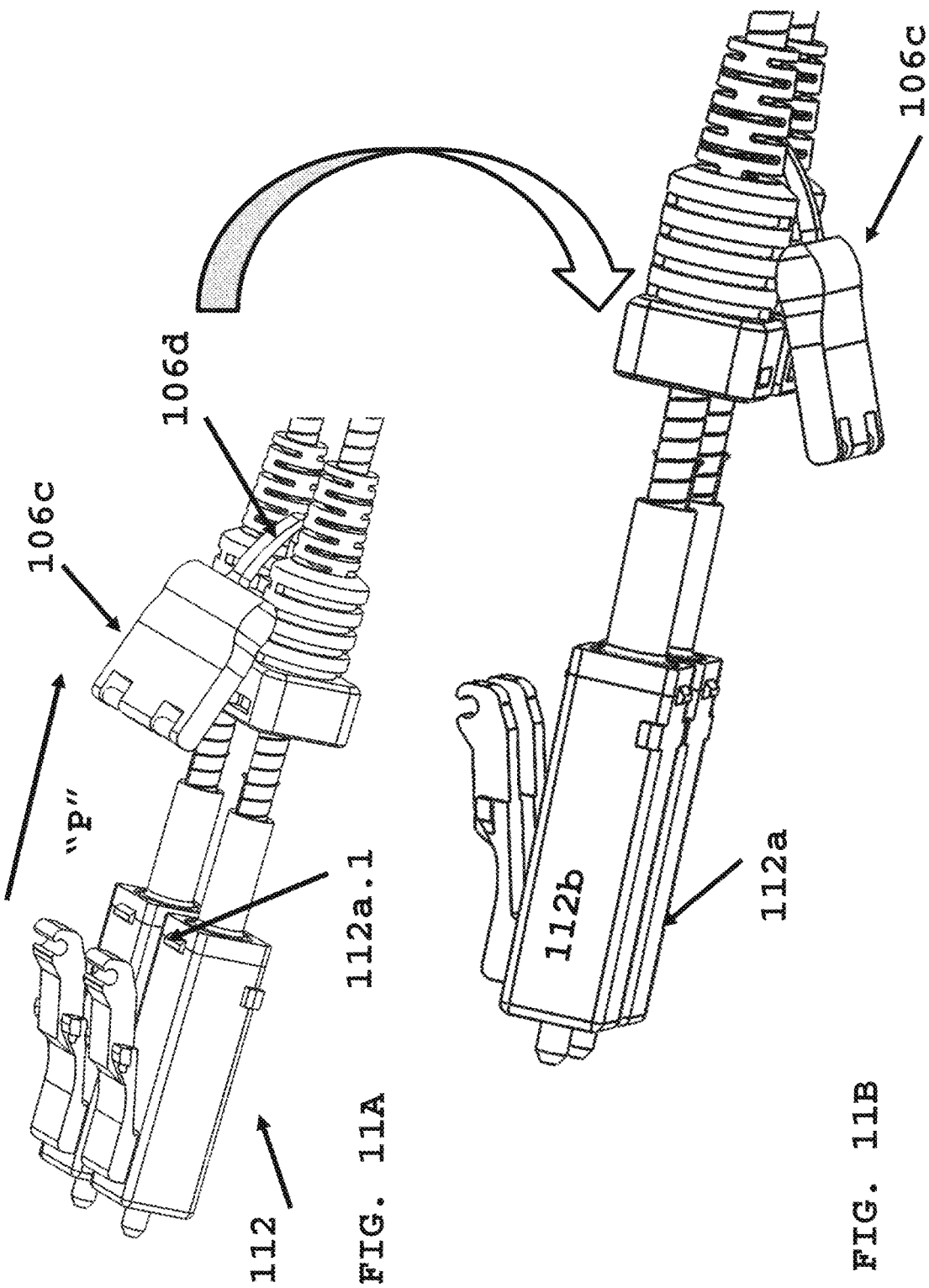

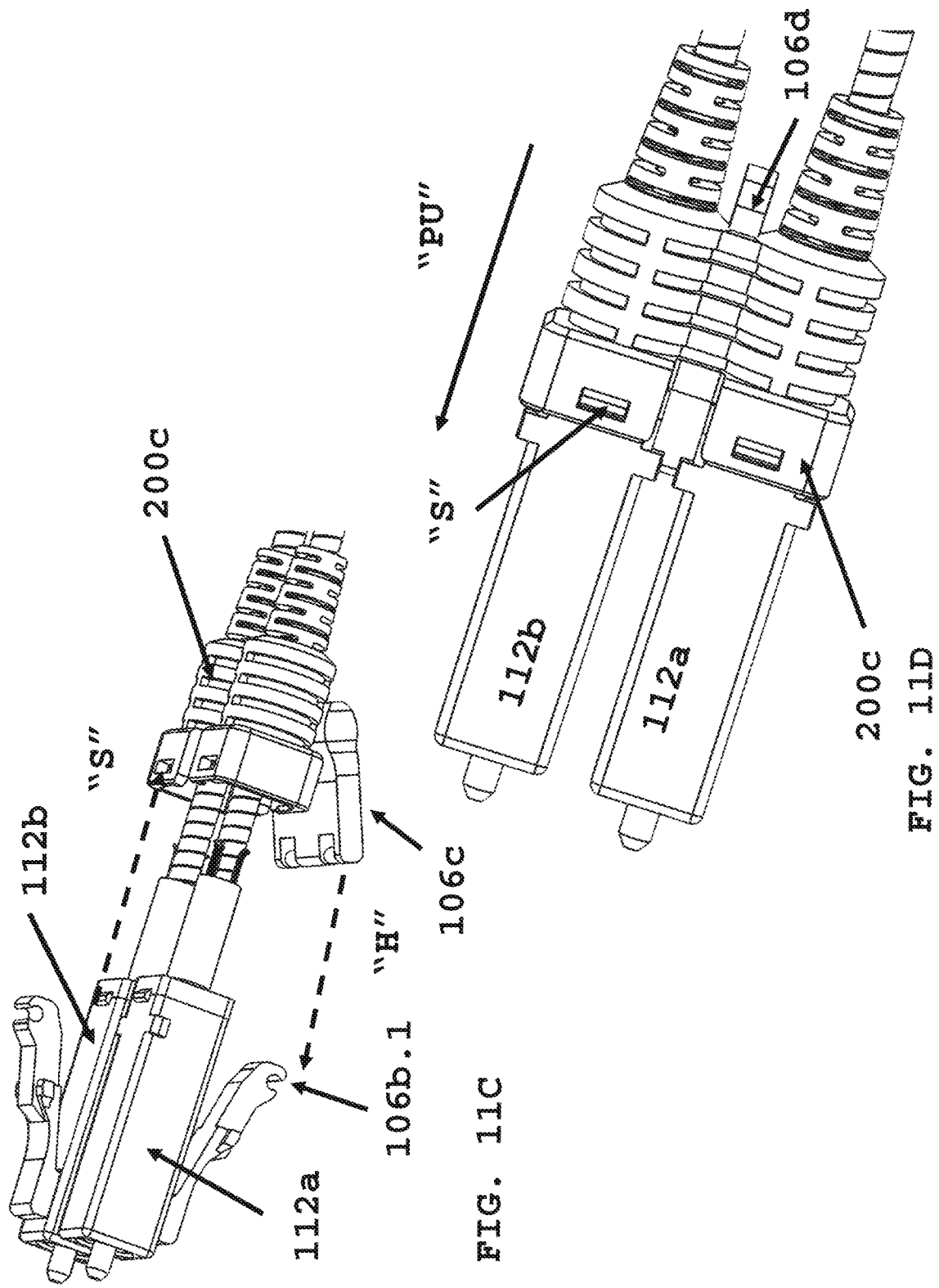

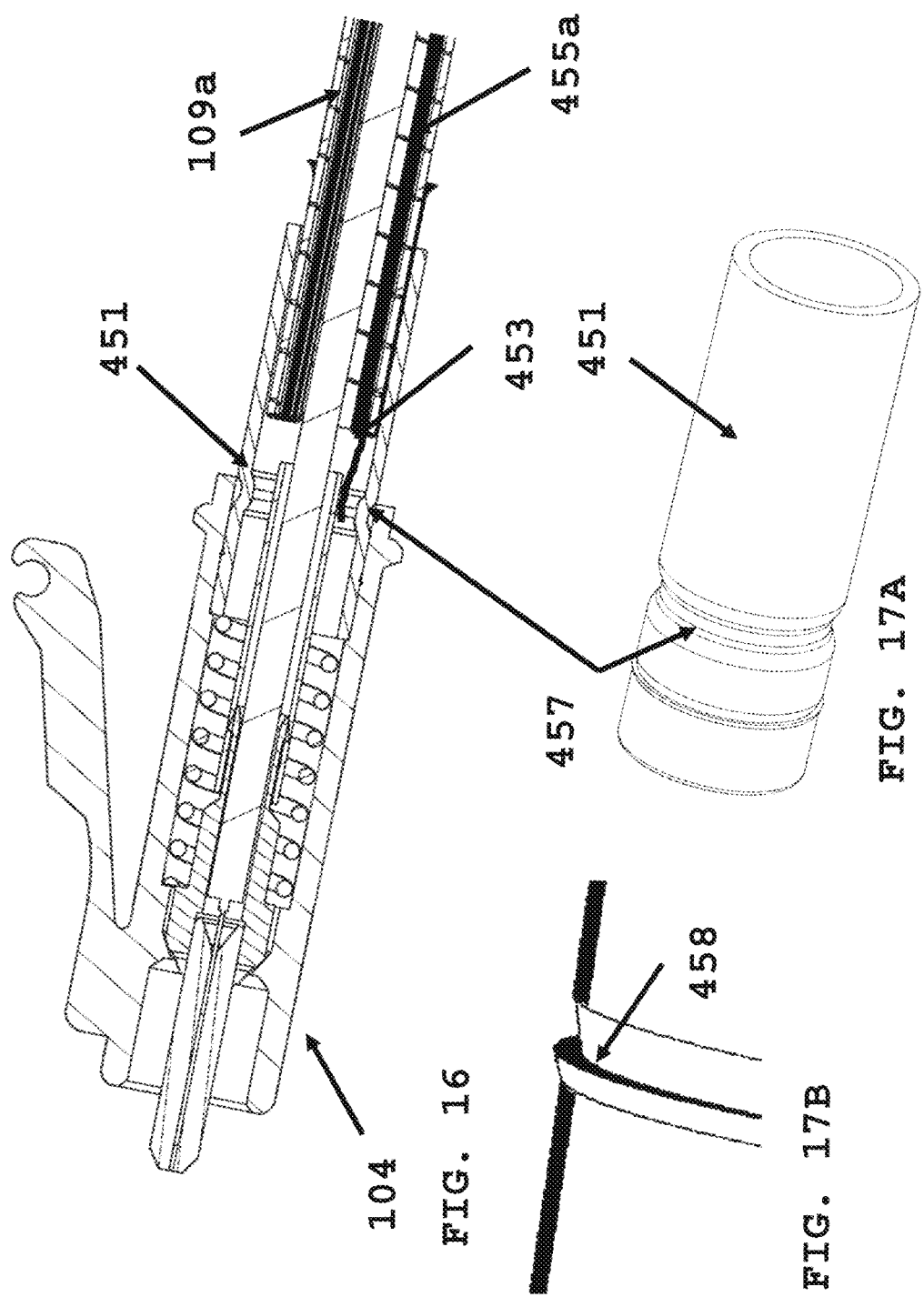

MULTI-POLARITY FIBER OPTIC CONNECTOR HAVING A DUPLEX CABLE BOOT ASSEMBLY

RELATED APPLICATIONS

The present application claims priority to U.S. Provisional Applicant 62/743,945 filed on Oct. 10, 2018, titled "Duplex Cable Boot Assembly with Polarity Change", and to U.S. Provisional 62/744,603 filed on Oct. 11, 2018, titled "Duplex Cable Boot Assembly with Improved Crimping Assembly", and to U.S. Provisional 62/744,628, filed on Oct. 11, 2018, titled "LC Duplex Connector with Spring Pusher Connector Release and Polarity Change" and all provisional applications are fully incorporated by reference in this case.

BACKGROUND

Demand for bandwidth by enterprises and individual consumers continues to experience exponential growth. To meet this demand efficiently and economically, data centers have to achieve ultra-high density cabling with low loss budgets. Fiber optics have become the standard cabling medium used by data centers to meet the growing needs far data volume and transmission speeds.

Individual optical fibers are extremely small. For example, even with protective coatings, optical fibers may be only about 250 microns in diameter (only about 4 times the diameter of a human hair). As such, hundreds of fibers can be installed in cables that will take up relatively little space. For connections between cables, however, the fibers are terminated with connectors. Multiple fibers may be arranged within a single connector. For example, multi-fiber connectors such as those using LC type connectors may contain and connect two fibers.

Typically, LC type connectors are joined together to connect the optical transmission path of one fiber optic cable to another fiber optic cable or device, and the connection may be made by inserting the LC type connectors in an LC adapter. An adapter generally includes a housing, or portion of a housing, having at least one port which is configured to receive and hold a connector to facilitate the optical connection of a connector ferrule with a ferrule of another connector or other device, thereby establishing an optical connection. Adapters may be used to facilitate connections contained within a chassis. The term "chassis" as used herein broadly refers to a containment structure for housing electrical components or switching components.

The polarity of a connector may is almost always predisposed during manufacturing of the connector and associated cable. For installations where the polarity may need to be changed for one reason or another, such as a renovation or installation of a new optical component, the polarity of typical connectors is not changeable or only changeable after disassembly and reassembly in the opposite designation. For example, some LC type connectors include a modular housing configured such that the position of the fibers terminated within the connector can be reversed, thus changing the polarity of the connector. However, this can be a time-sensitive procedure and, based upon the abilities of the person changing the connector, may be prone to error.

Therefore, there remains a need for multi-fiber, fiber optic connectors that have the flexibility of easily changing the polarity of a fiber connection quickly and efficiently on site.

SUMMARY

In an embodiment, a multi-polarity fiber optic connector is provided to change polarity from a first polarity to a second polarity where the first polarity is not the same as the second polarity. The multi-polarity fiber optic connector has a plural of fiber optic connectors secured together with a duplex cable boot assembly. Each fiber optic connector has a plug frame or housing with a ferrule at a proximal end of the fiber optic connector, a backpost at a distal end of the plug frame, and a duplex cable boot assembly is configured to secure to each backpost of the fiber optic connector. Each backpost has crimp ring which is fitted over the backpost for securing the fiber optic cable to the fiber optic connector. The crimp ring has a recess that is configured to accept and further secure the duplex cable boot assembly to the distal end of the plural of fiber optic connectors. Attached to an outer surface of each plug frame is a release latch to remove the fiber optic connector from an adapter port.

The duplex cable boot assembly has a plural of protrusions at a proximal end of a bridge member formed as part of the duplex cable boot assembly. The protrusions are received in a corresponding recess or cut-out located at a distal end of each plug frame of the fiber optic connector forming the plural of fiber optic connectors undergoing polarity change. The bridge member interconnects the cable boots together which interconnects the two LC fiber optic connectors.

After removing the multi-port fiber optic connector from the adapter port, the user pulls the duplex cable boot assembly rearward. This releases the plural of protrusions located at the proximal end of the duplex cable boot assembly from their corresponding recesses or cut-outs at a distal end of each fiber optic connector plug frame, and then each fiber optic connector can be rotated 180 degrees about its crimp ring when its recess allows for rotation without removing the fiber optic connector from its correspond cable hoot formed as part of the duplex cable boot assembly. Once the first fiber optic connector is rotated, the second fiber optic connector is rotated, and the duplex cable boot assembly is pushed in the proximal direction with the duplex cable boot assembly protrusions being secured into its corresponding recess or cut-out located at the distal end of the fiber optic connector plug frame, thereby completing polarity change of the multi-polarity fiber optic connector.

In an alternative embodiment, the backpost has a circumferential groove that accepts a plural of strength members, generally polyester fibers, within the groove. When a crimp ring is pressed over the backpost, the strength members are captured within the groove thereby securing a fiber optic cable through each cable boot, to the distal end of the plug frame. The backpost may have a raised lip that further secures backpost to a distal end of the plug frame.

In an alternative embodiment, a third backpost assembly can replace the standard backpost and crimp ring. A backpost and pin tube capture the strength fibers therebetween, and the backpost with the strength members circumferential about the backpost, the backpost is inserted into a distal end of the plug frame and crimped using the crimp ring thereby securing the optical fiber cable to the backpost.

In another embodiment of the duplex cable boot assembly, a dual latch release with a hook is secured About a bridge member of the duplex cable boot assembly, that when depressed, depresses each latch release on the outer plug frame of the fiber optic connectors secured together by the duplex cable boot assembly. Once the dual release latch is depressed, the user can pull rearward the duplex cable boot assembly, removing the plural of fiber optic connectors from an adapter port. Then the user can rotate each of the fiber optic connectors 180 degrees from a first polarity to a second polarity, where the first polarity is not the same as the second polarity. The hook prevents the dual latch release from separating from the duplex cable boot assembly.

In another embodiment, a method of changing the polarity of an optical connection is described. The method may include providing a multi-polarity fiber optic connector, the connector including a first ferrule, a second ferrule and each housed in a corresponding plug frame. A duplex cable boot assembly secures the plural of fiber optic connectors together. A user releases the multi-polarity fiber optic connector from an adapter port using a latch release on each fiber optic connector, or a dual latch release to release the multi-polarity fiber optic connector latches together. Once released from the adapter port, the user pulls on the duplex cable boot assembly which removes protrusions from their corresponding plug frame recesses thereby allowing a user to rotate each fiber optic connector 180 degrees to change the fiber optic connector from a first polarity to a second polarity.

BRIEF DESCRIPTION OF THE FIGURES

FIG. 1 depicts a duplex cable boot assembly securing two LC fiber optic connectors forming a multi-polarity fiber optic connector;

FIG. 2 depicts a rear view of FIG. 1;

FIG. 10A depicts the duplex cable boot assembly with a hook to secure the dual latch release in a first polarity position;

FIG. 10B depicts the duplex cable boot assembly with a hook to secure the dual latch release in a second polarity position;

FIG. 11A depicts an exploded view of a plural of LC type fiber optic connectors during removal of duplex cable boot assembly configured with a dual latch release;

FIG. 11B depicts rotating the dual latch release of FIG. 11A;

FIG. 11C depicts rotating the first LC connector of FIG. 11A;

FIG. 11D depicts an assembled multi-polarity fiber optic connector after rotating the second LC connector and pushing the duplex cable boot assembly onto a distal end of the connector plug frames;

FIG. 16 is a cross-section view of a groove backpost securing a metal jacketed fiber optic cable to a distal end of a plug frame;

FIG. 17A is a backpost with a circumferential groove;

FIG. 17B is the backpost of FIG. 17A with a raised lip, and

DETAILED DESCRIPTION

Figure 3:
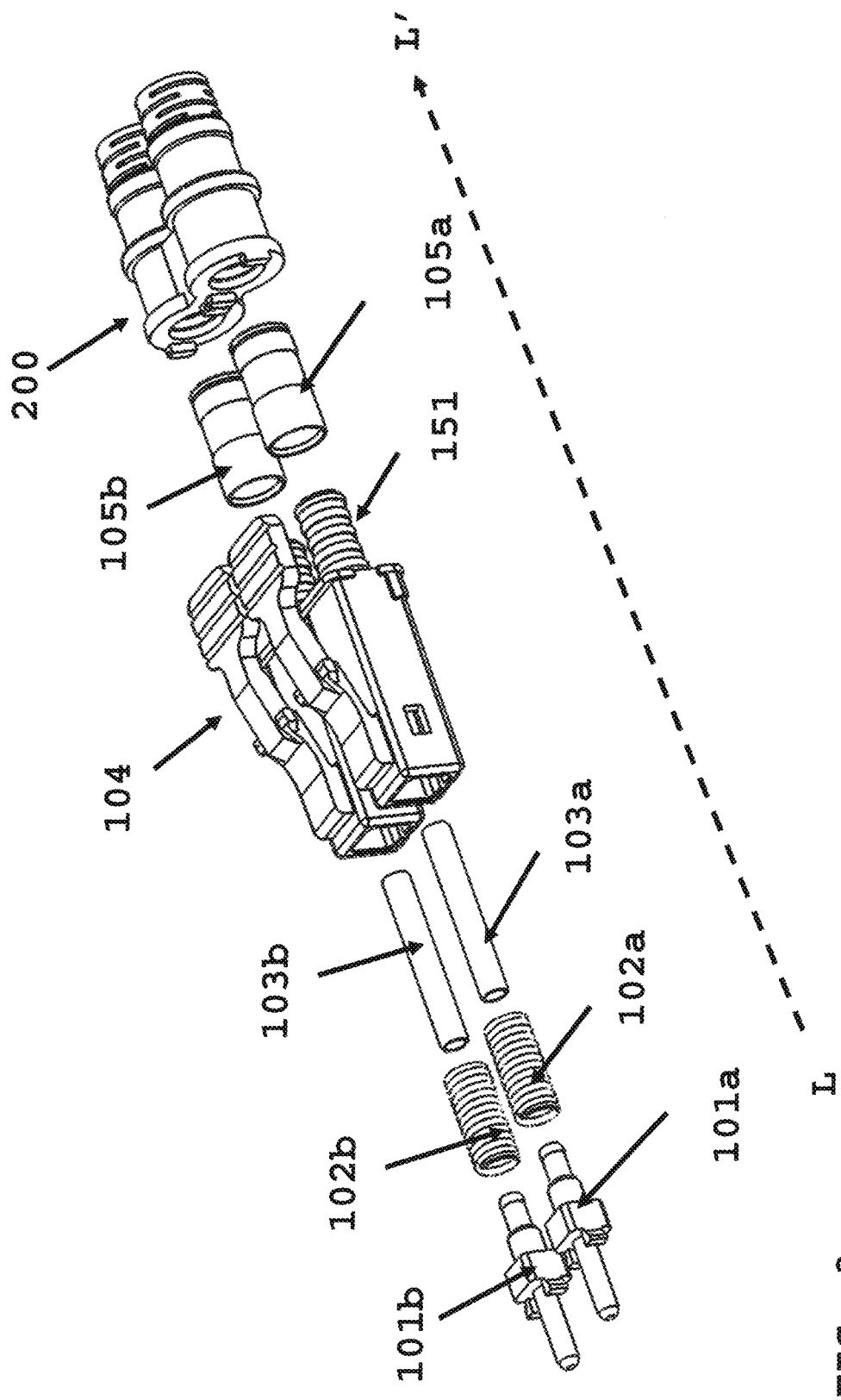
FIG. 3 depicts an exploded view of FIG. 1.

As used herein, the term "optical fiber" is intended to apply to all types of single mode and multi-mode light waveguides, including one or more bare optical fibers, coated optical fibers, loose-tube optical fibers, tight-buffered optical fibers, ribbonized optical fibers, bend performance optical fibers, bend insensitive optical fibers, nanostructured optical fibers or any other expedient for transmitting light signals. A multi-fiber optic cable includes a plurality of the optical fibers. Such cables have a variety of names depending on their particular usage, and may be considered as "trunk cables" or "trunks" when connected to fiber optic modules used to form connections to jumper cables using a select polarity.

Various parts, components or configurations described with respect to any one embodiment above may also be adapted to any others of the embodiments provided.

This disclosure is not limited to the particular systems, devices and methods described, as these may vary. The terminology used in the description is for the purpose of describing the particular versions or embodiments only, and is not intended to limit the scope.

FIG. 1 depicts an assembled view of multi-polarity fiber optic connector 100. Duplex cable boot assembly 200 (at FIG. 3) is secured to a distal end of plug frame (104a, 104b) by a plural of protrusions (201d) received in recess or cut-out 110a (at FIG. 5) Plural of protrusions (201a-201d) are positioned about a proximal end of duplex cable boot assembly (at FIG. 4). Protrusions (201a-201d) are received into corresponding cut-out 110, the cut-outs orients the duplex cable boot assembly at a distal end of the plural of plug frame. Each plug frame (104a, 104b) has release latch (106a, 106b) attached to an outer surface of the plug frame. FIG. 2 depicts a rear view of FIG. 1 with a plural of cable boot (200a, 200b) integrally formed as part of bridge member (203) (at FIG. 4).

Figure 18:
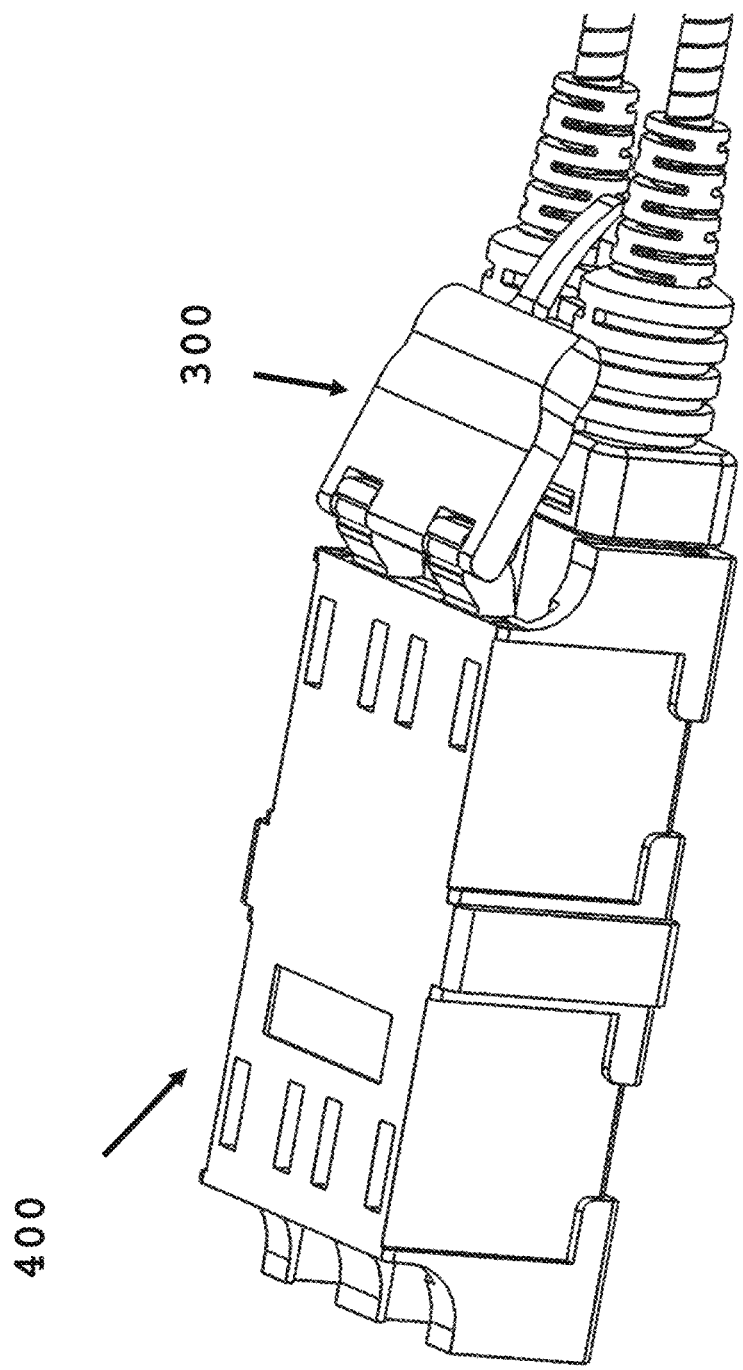
FIG. 18 is a multi-polarity fiber optic connector secured within an adapter port.

FIG. 3 depicts an exploded view of multi-polarity fiber optic connector 100 along its longitudinal (L-L') axis. Ferrule assembly (1010a, 101b) is biased by spring (102a, 102b) when the connector is assembled. Flange tube (103a, 103b) protects a distal end if the ferrule where an optical fiber from a fiber optic cable is spliced to an optical fiber contained within the ferrule. Plug frame 104 accepts the ferrule assembly, spring and flange tube at a proximal end. A distal end of plug framed 104 has backpost 151 over which crimp ring (105a, 105b) is placed. Crimp ring (1075a, 105b) have recess (105c) (at FIG. 5) that is configured to receive duplex cable boot assembly (at FIG. 4). Recess 105c allows crimp ring 105a which is secured to backpost 151, which is secured to connector 112a (at FIG. 7A) to be rotated during a polarity change as described below. Fiber optic connectors (112a, 112a) are not connected together (at FIG. 7C) but secured together while in adapter 400 port by bridge member 203 formed as part of duplex cable boot assembly 300 (at FIG. 18).

Figure 4:
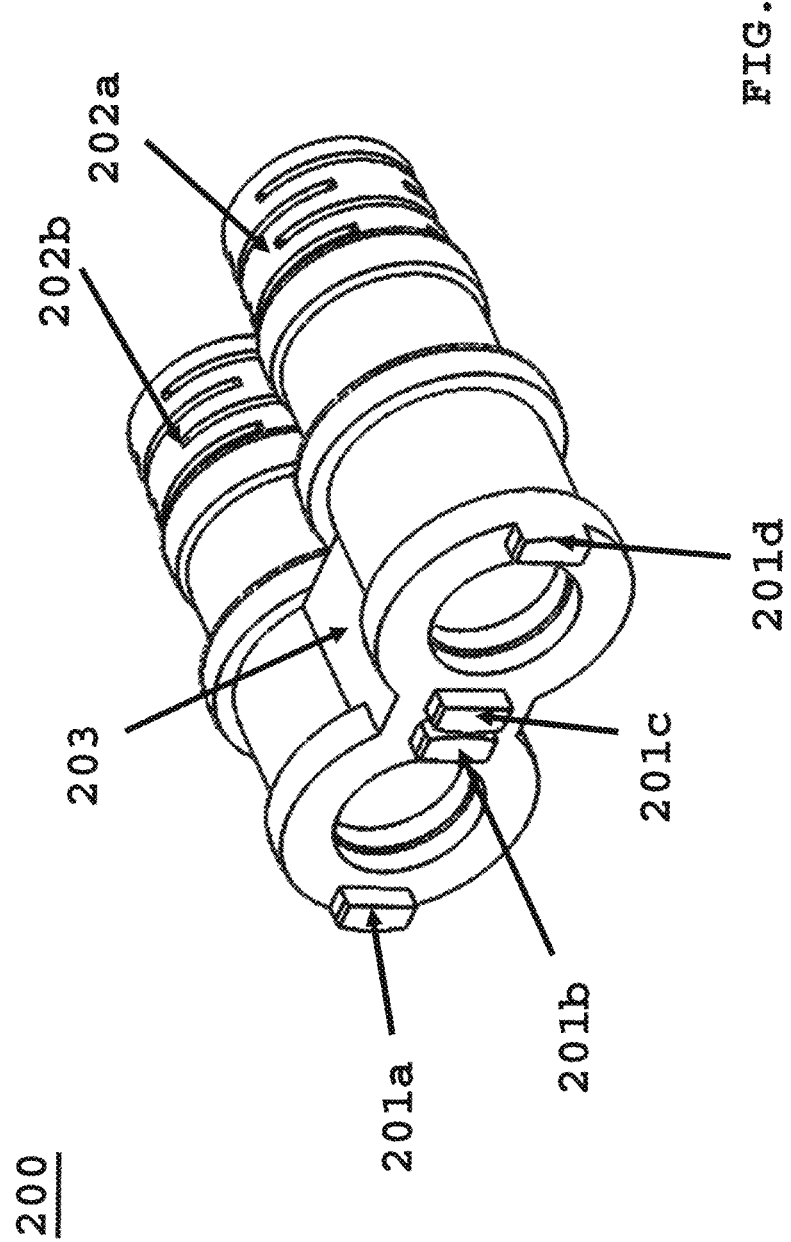
FIG. 4 depicts the duplex cable boot assembly.
Figure 5:
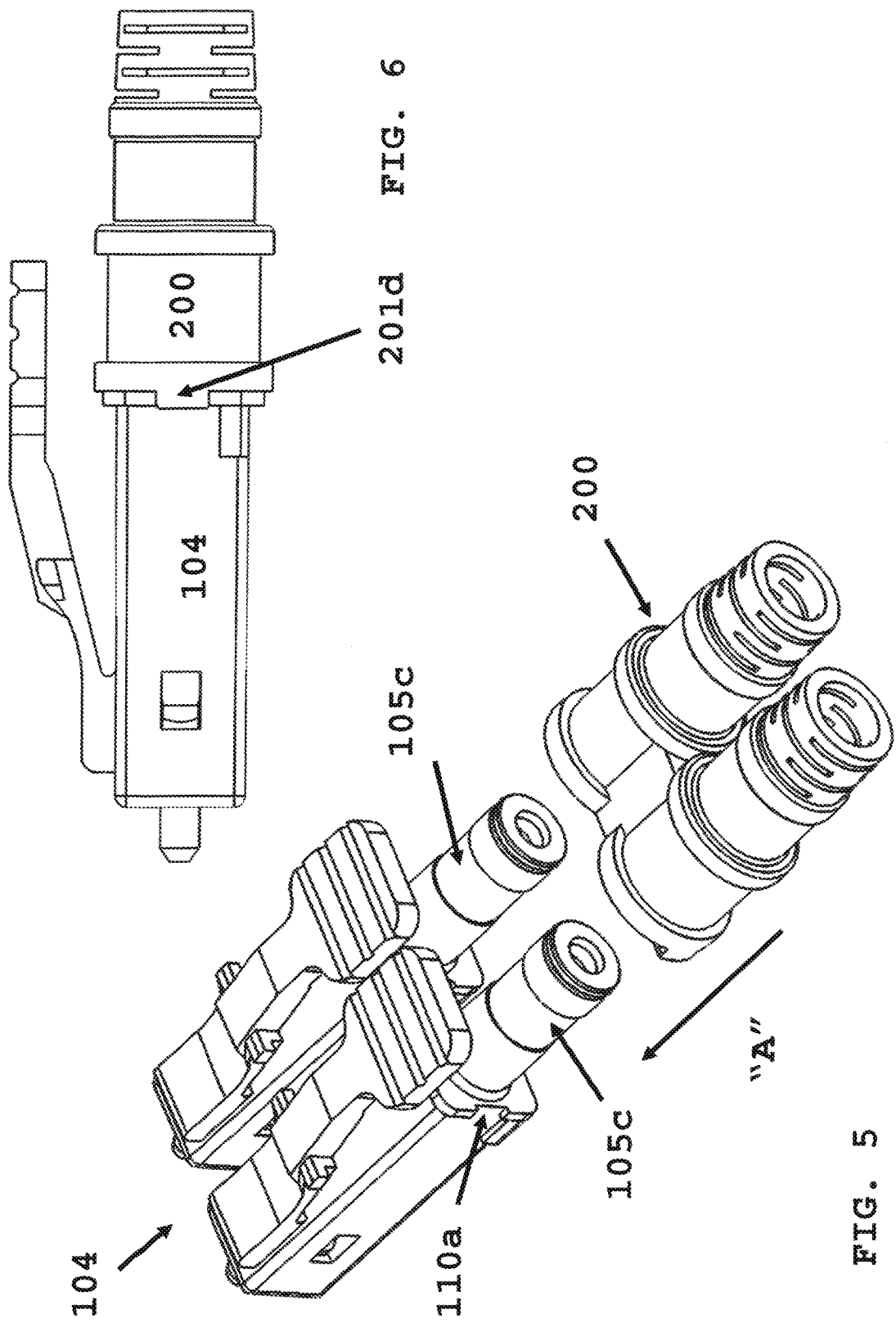
FIG. 5 depicts an exploded view of a plural of fiber optic connectors prior to accepting the duplex cable boot assembly.
Figure 6:
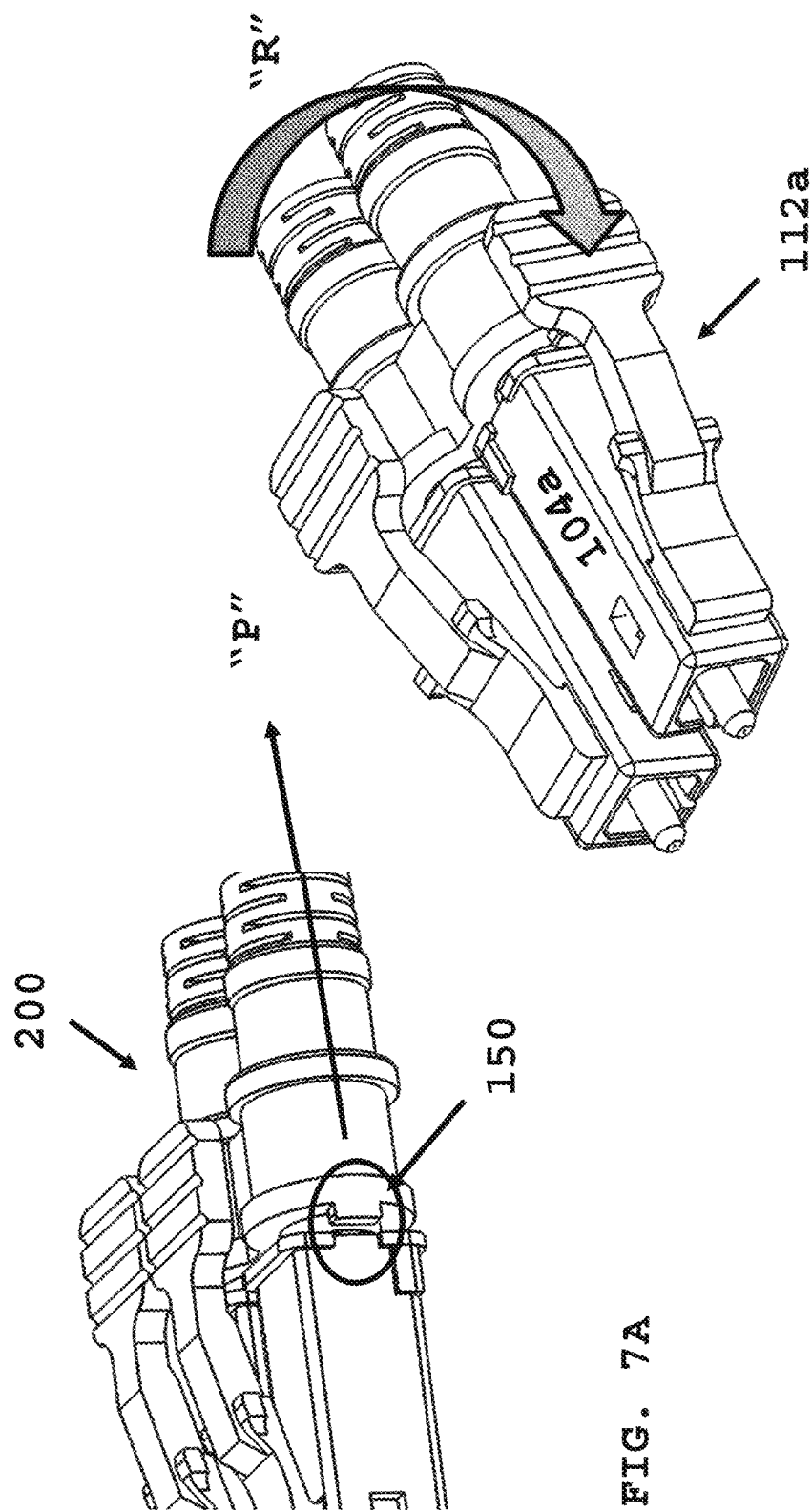
FIG. 6 depicts a side view of FIG. 1.
Figure 7:
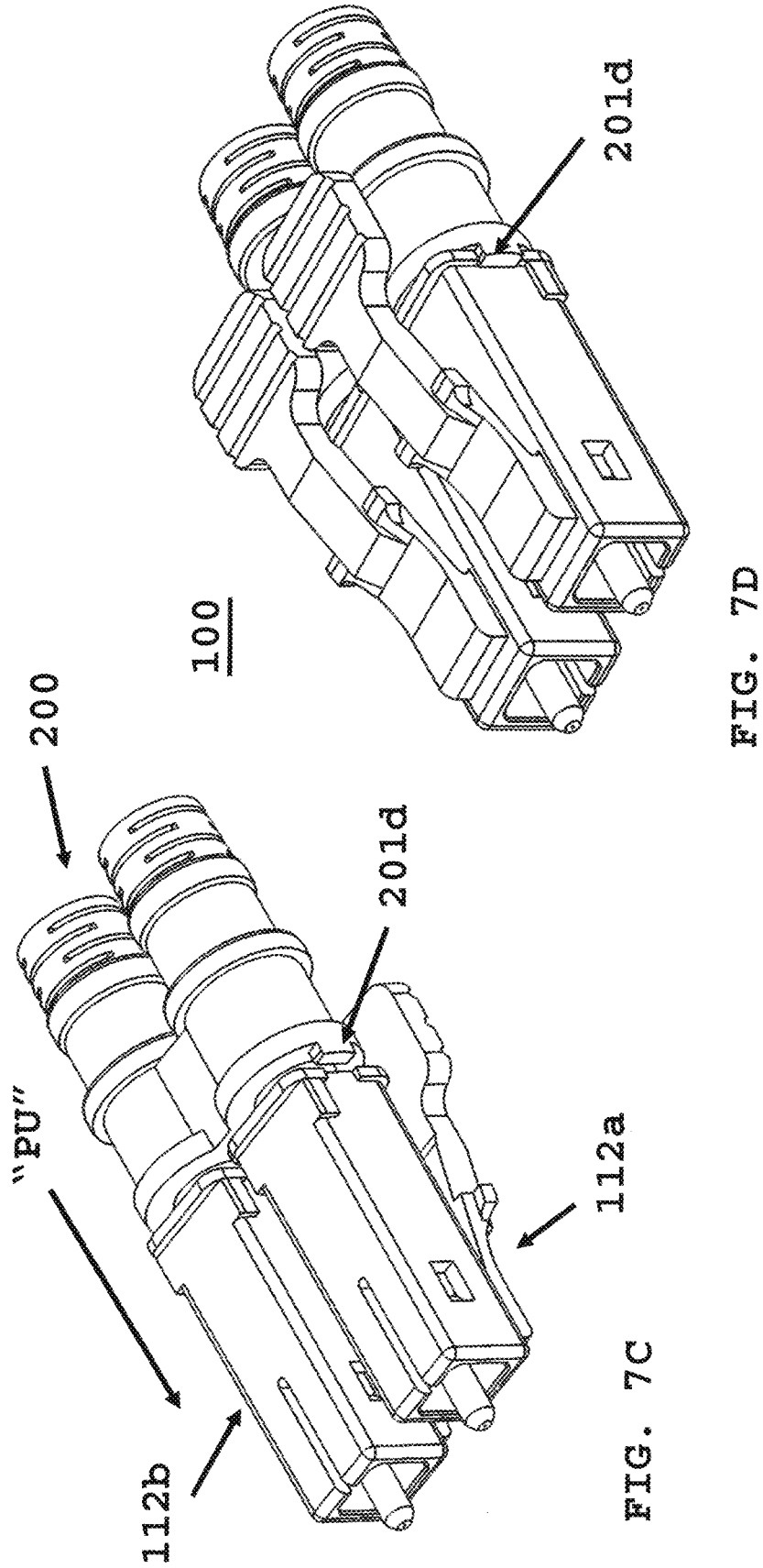
FIG. 7A depicts a zoomed view of FIG. 6 between the fiber optic connector and the duplex cable boot assembly.
FIG. 7B depicts rotating one of the plural of fiber optic connectors after moving rearward the duplex cable boot assembly.
FIG. 7C depicts rotating all of the plural of fiber optic connectors.
FIG. 7D depicts the multi-polarity fiber optic connector in a second polarity position from the first polarity position of FIG. 7A.

FIG. 4 depicts an embodiment of duplex cable boot assembly 200. Bridge member 203 interconnects a plural of cable boot (202a, 202b) through which a fiber optic cable is passed and its optical fiber is spliced to an optical fiber formed as part of the ferrule. At a proximal end of duplex cable boot assembly are a plural of protrusions (201a-201d) that axe received in recess or cut-out 110 formed at a distal end of plug frame (104a, 104b). Protrusions (201a-201b) can be released from their corresponding recess or cut-out 110 during polarity change of the multi-polarity fiber optic connector as described below. FIG. 5 depicts an exploded view of two LC type fiber optic connectors prior to being interconnected using duplex cable boot assembly 200. FIG. 6 is a side view of FIG. 1 assembled, with protrusion 201d secured within recess or cut-out 110a (at FIG. 5), FIG. 7A depicts pulling rearward duplex cable boot assembly 200 in direction of arrow "P" at the start of polarity change of the multi-polarity fiber optic connector. At call-out 150 protrusion 201d (at FIG. 6) is released from recess or cut-out 110a (at FIG. 5). At step two, FIG. 7B depicts rotating, in direction of arrow at "R", fiber optic connector 112a about its backpost and the crimp ring (not shown) to change the fiber optic connector 112a from a first polarity (FIG. 1) to a second polarity (at FIG. 7D). At step 3, FIG. 7C depicts both connectors (112a, 112b) rotated 180 degrees and pushing duplex cable boot assembly 200, in direction of arrow "PU", placing protrusion 201d within recess or cut-out 110a, to complete polarity change as depicted at Step 4 in FIG. 7D with protrusion 201d fully inserted into the plug frame recess or cut-out. At FIG. 7D, multi-polarity fiber optic connector 100 has been converted to the second polarity from the first polarity (at FIG. 7A) where the first polarity is not the same as the second polarity.

Figure 8:
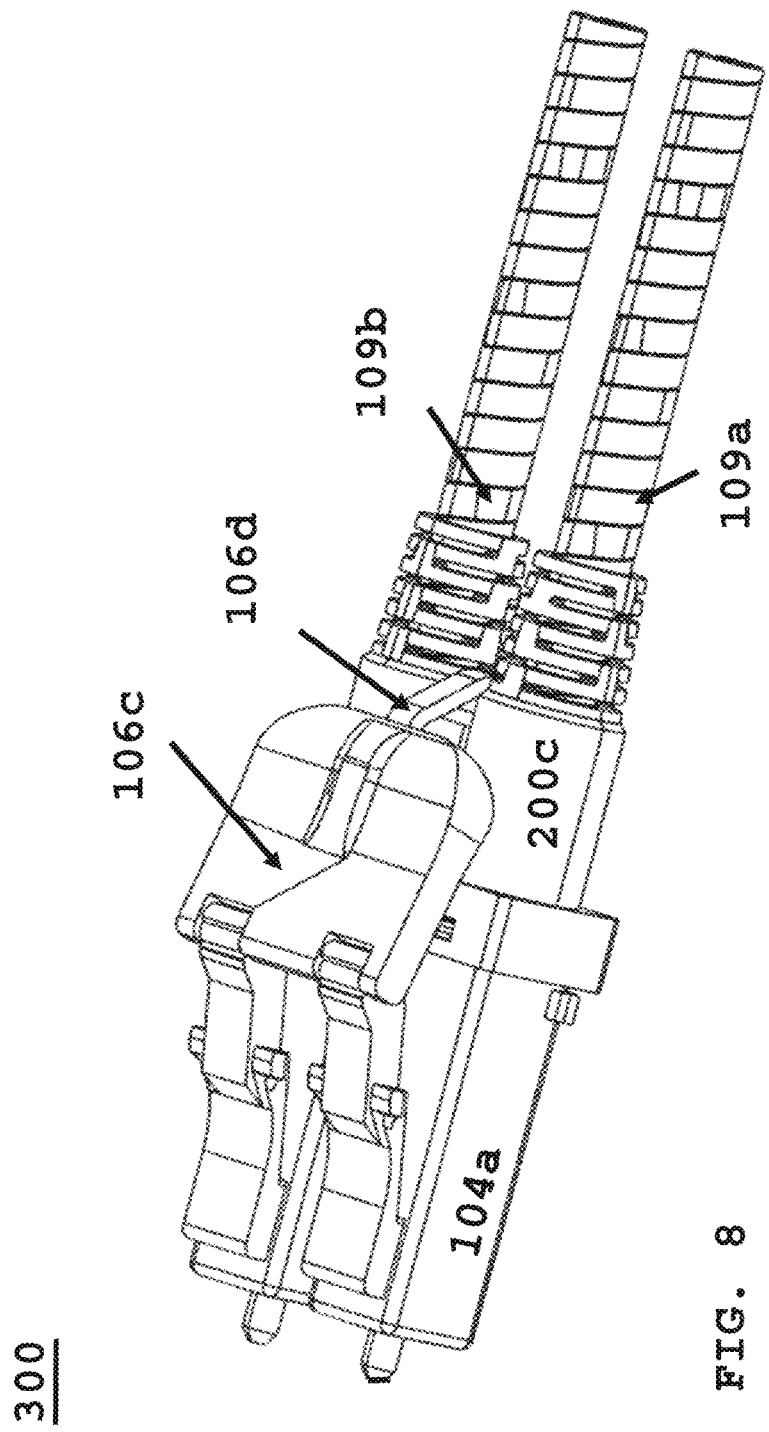
FIG. 8 depicts the multi-polarity fiber optic connector of FIG. 7A deployed with a dual latch release and a metal jacketed fiber optic cable according to another embodiment of the present invention.
Figure 9:
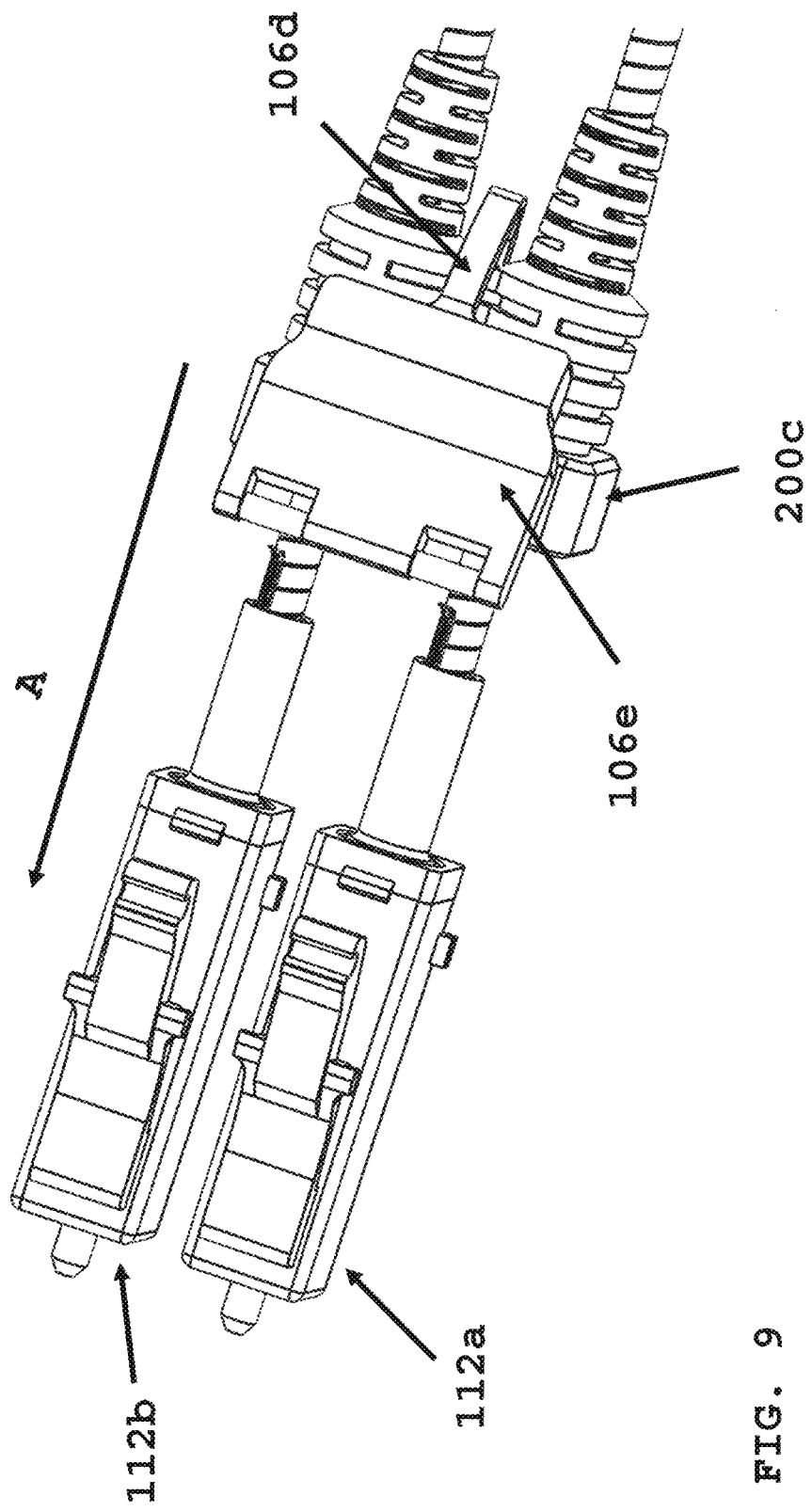
FIG. 9 depicts assembly of the duplex cable boot assembly deploying the dual latch release to form the fiber optic connector of FIG. 8.

FIG. 8 depicts multi-polarity fiber optic connector 300 with duplex cable boot assembly 200c with dual tab release 106c. Hook 106d secures dual tab release 106c to duplex cable boot release 200c. As with duplex cable boot release 200, assembly 200c is secured to a distal end of plug frame (104a, 104b) in direction of arrow A. In this embodiment metal jacketed (109a, 109b) fiber optic cable is used. FIG. 9 depicts assembling duplex cable boot assembly 200c onto a distal end of LC fiber optic connectors (112a, 112b). The dual latch release has recess 106e for a user to depress more easily. FIG. 10A depicts duplex cable boot assembly 200c with a plural of recesses 200d that accept corresponding protrusion 112a.1 and the like at the distal end of connector 112. This secures duplex cable boot assembly 200c to the plural of connectors (112a, 112b) (at FIG. 11B). FIG. 10B depicts duplex cable boot assembly 200c in a second polarity position after rotating in direction of arrow "R" from a first polarity position in FIG. 10A. Hook 106d that secures dual tab release to bridge member 203 passes through an opening in the bridge member.

FIGS. 11A-11D depict changing multi-polarity connector for a first polarity (at FIG. 11A) to a second polarity at FIG. 11D, where duplex cable boot assembly 200c deploys dual tab release 106c. At FIG. 11A, assembly 200c is removed from connectors 112 in direction of arrow "P". Assembly 200c is rotated 180 degrees in direction of arrow "R" to FIG. 11B. Alternatively, dual tab release 106c is shown as one-piece formed as part of assembly 200c at FIG. 11B as opposed to FIG. 12, and integrated with hook 106d (at FIG. 10A). FIG. 11C depicts rotating fiber optic connector 112a 180 degrees to a second polarity position from a first polarity position in FIG. 11A. Assembly 200c is secured along dotted line "S" to a distal end of connectors 112. Dual tab release 1060 is secured to latch release recess 106b.1 along dotted line "H". A final assembly in the second polarity position for multi-polarity connector 300 is shown at FIG. 11D. Referring to FIG. 11D, connector 112b is secured at "S" by a protrusion on the distal end outer surface of connector 112b that is received with opening 200d at the proximal end of the duplex cable boot assembly (at FIG. 10A).

Figure 12:
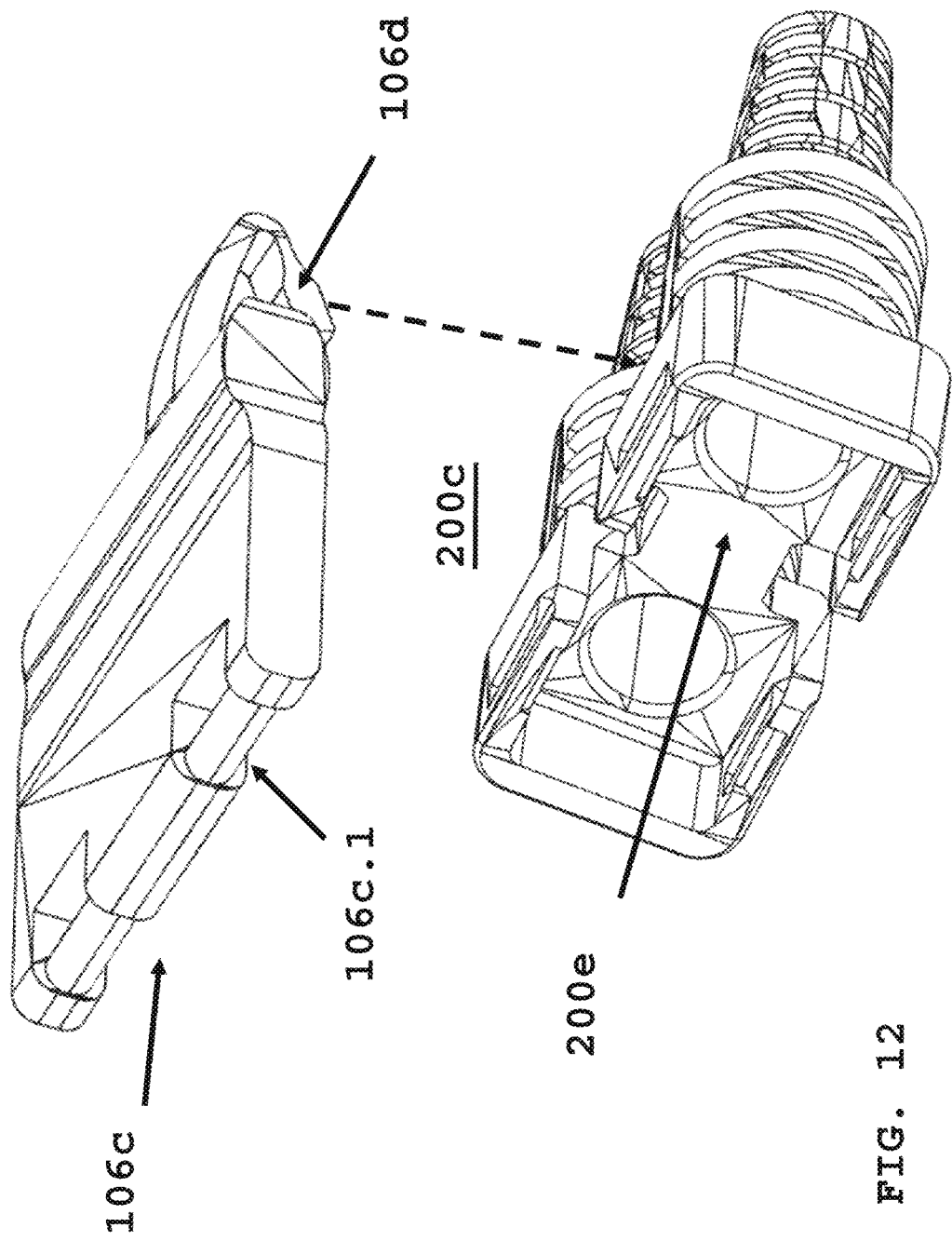
FIG. 12 depicts an exploded view of the dual latch prior to securing to the duplex cable boot assembly.
Figure 13:
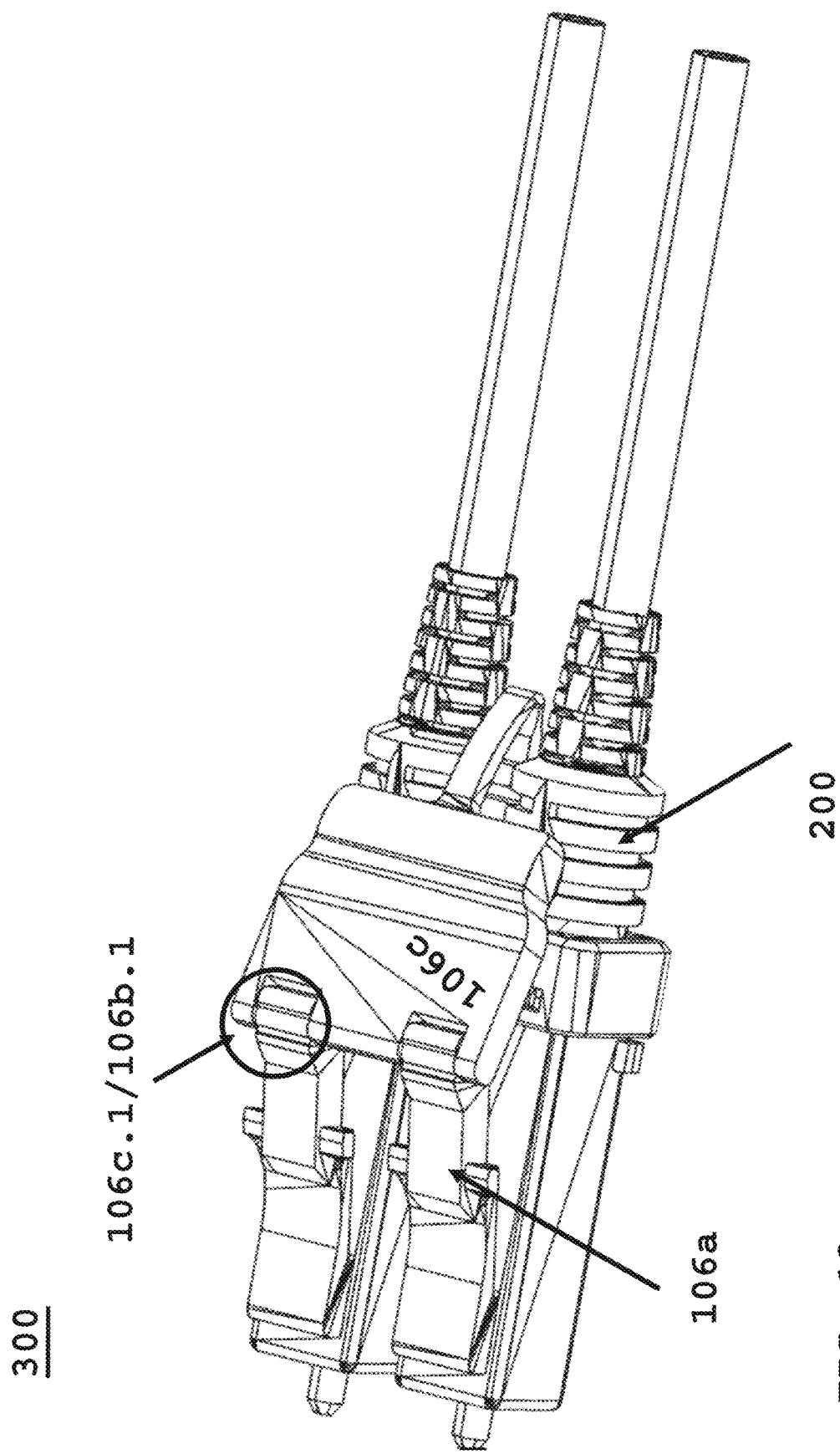
FIG. 13 depicts an assembled view of dual release latch and duplex cable boot assembly.

FIG. 12 depicts attaching dual tab release 106c to duplex cable hoot assembly 200c using hook 106d at dotted line about mid-portion 200e of assembly 200c. FIG. 13 depicts dual tab release 106c secured to latch release (106a, 106b) at call out 106c.1/106b.1. FIG. 12 depicts 106c.1 catch receives latch release recess 106b.1 (at FIG. 11C).

Figure 14A:
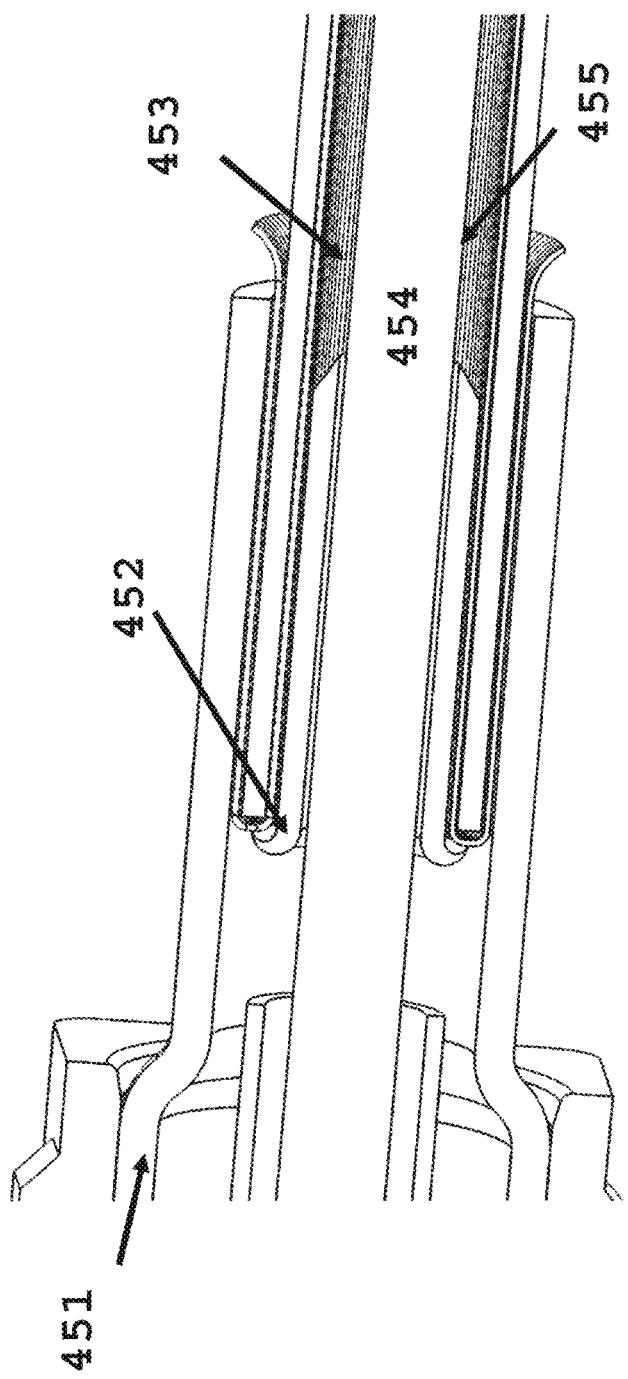
FIG. 14A depicts a cross-section view of a pin tube and a ringed backpost for securing strength members of a fiber optic cable to a fiber optic connector.
Figure 14B:
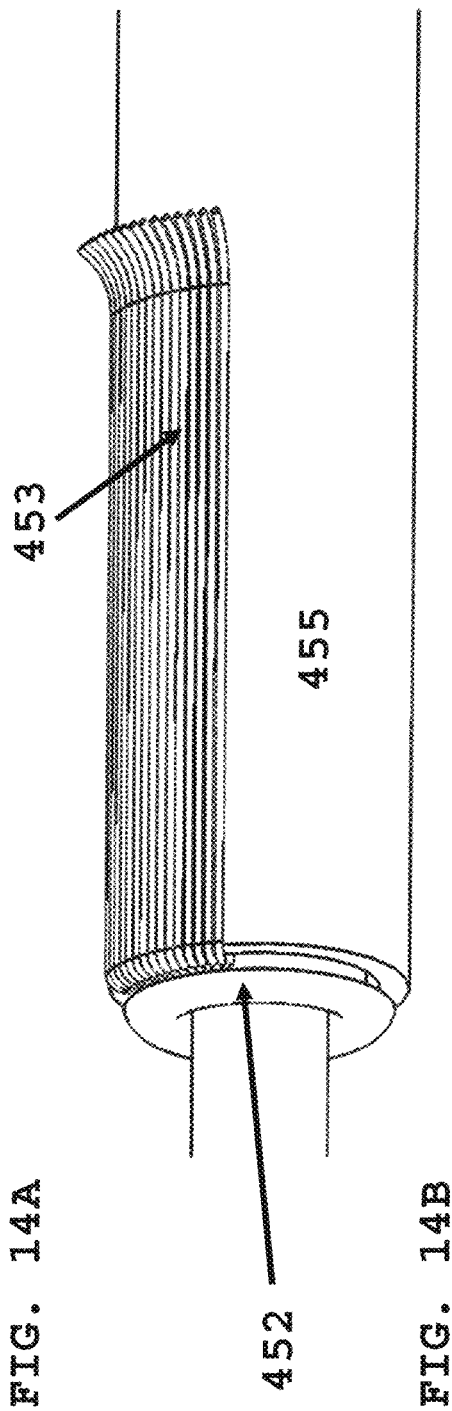
FIG. 14B depicts a view of strength members placed on an outer surface of the ringed backpost of FIG. 14A.
Figure 15:
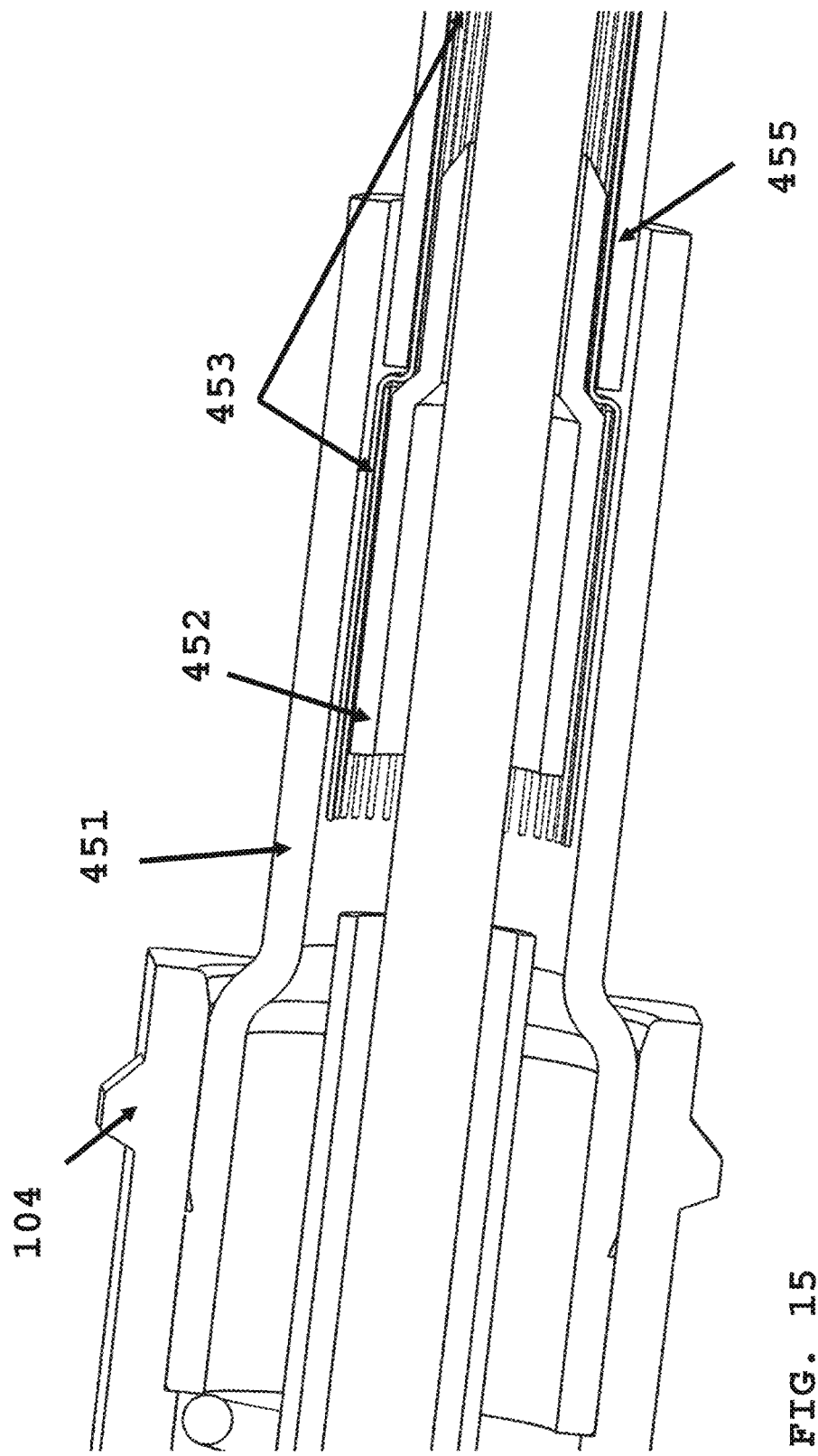
FIG. 15 depicts the assembly of FIG. 14B secured within a backpost of the fiber optic connector plug frame.

FIG. 14A depicts pin tube 452 securing strength members 453 formed as part of fiber optic cable 454. Pin tube 452 is inserted into backpost 451 securing the strength members between backpost 451, cable jacket 455 (at FIG. 14B) and outer surface of pin tube 452. FIG. 14B depicts strength members 453 on outer surface of cable jacket 455 and between pin tube 452 and inner surface of cable jacket (at FIG. 14B). FIG. 15 depicts a cross-section of strength members 453 secured between pin tube 452 and backpost 451 when secured to a distal end of plug frame 104.

FIG. 16 depicts a cross-section of backpost 451 (at FIG. 17A) secured within a distal end of plug frame 104. Fiber optic cable is metal jacketed 109a. Strength members 453 are secured between metal jacket 109a and backpost 451. Strength members 453 are captured within a circumferential groove 457 (at FIG. 17A) of backpost 451 (at FIG. 17A). FIG. 17B depicts backpost 451 with raised lip 458 to aid in securing backpost 451 in plug frame 104 (at 16).

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein, in a figure, an element number 110 describes the recess generally and element numbers 110a, 110b describe multi-recesses.

The present disclosure is not to be limited in terms of the particular embodiments described in this application, which are intended as illustrations of various aspects, Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" tea (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction would intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A multi-polarity fiber optic connector is configured to provide a plurality of connector polarity options, the fiber optic connector comprising:
   a plural of fiber optic connectors with a plug frame having at least one optic fiber therein and a latch release located on an outer surface of the plug frame for releasing the fiber optic connectors from an adapter port, each of the optical fiber connectors configured to terminate a respective optical fiber cable;
   a duplex cable boot assembly configured to be accepted at a distal end of the plural of plug frame, the duplex cable boot assembly comprising a plural of cable boots and a bridge member connecting the cable boots, each cable boot configured to receive the optical fiber cable terminated by a respective one of the fiber optic connectors, the plural of cable boots and the bridge member being integrally formed as a single part; and wherein
   the duplex cable boot assembly is pulled rearward to displace the plural of cable boots and the bridge member away from the plural of fiber optic connectors as a unit and thereby allows a user to rotate the plural of fiber optic connectors from a first polarity position to a second polarity position, and further wherein the first polarity is not the same as the second polarity.

2. The multi-polarity fiber optic connector according to claim 1, wherein a dual latch release releases the plural of fiber optic connectors from the adapter port.

3. The multi-polarity fiber optic connector according to claim 2, wherein the dual latch release further comprises a hook that is secured about the bridge member to secure the dual latch release to the duplex cable boot assembly.

4. The multi-polarity fiber optic connector according to claim 1, wherein the plug frame has at least one protrusion on the outer surface, and wherein the at least one protrusion is accepted into a recess at a proximal end of the duplex cable boot assembly to secure the duplex cable boot assembly to the plural of fiber optic connectors.

5. The multi-polarity fiber optic connector according to claim 2, wherein the dual latch release has a catch that secures to a corresponding recess on the latch release of each one of the plural of fiber optic connectors.

6. The multi-polarity fiber optic connector according to claim 1, wherein each of the cable boot is received on a recess formed as part of a crimp ring that is fitted over a backpost of each of the fiber optic connectors.

7. The multi-polarity fiber optic connector according to claim 6, wherein each of the backpost further comprise a circumferential outer groove that when crimped captures a plural of strength fibers provided with the fiber optic cable.

8. The multi-polarity fiber optic connector according to claim 7, wherein each of the backpost proximal of the circumferential outer groove further comprises a raised lip, and further wherein the raised lip prevents the backpost from being pulled out of the plug frame.

9. The multi-polarity fiber optic connector according to claim 6, wherein the backpost further comprises a pin tube.

10. The multi-polarity fiber optic connector according to claim 9, wherein the pin tube and the backpost secure strength fibers therebetween, and further wherein the backpost is secured within the distal end of each fiber optic connector.

11. The multi-polarity fiber optic connector according to claim 1, wherein the fiber optic cable further comprises a metal outer jacket.

* * * * *